(12) United States Patent
Gong et al.

(10) Patent No.: US 8,865,316 B2
(45) Date of Patent: Oct. 21, 2014

(54) RUBBER LAMINATE

(75) Inventors: Peng Gong, Hiratsuka (JP); Kazuto Yamakawa, Hiratsuka (JP); Naoto Torii, Hiratsuka (JP); Akira Sato, Hiratsuka (JP)

(73) Assignee: The Yokohama Rubber Co., Ltd (JP)

( * ) Notice: Subject to any disclaimer, the term of this patent is extended or adjusted under 35 U.S.C. 154(b) by 233 days.

(21) Appl. No.: 13/500,190

(22) PCT Filed: Dec. 28, 2009

(86) PCT No.: PCT/JP2009/071917
§ 371 (c)(1),
(2), (4) Date: Apr. 4, 2012

(87) PCT Pub. No.: WO2011/042998
PCT Pub. Date: Apr. 14, 2011

(65) Prior Publication Data
US 2012/0196068 A1     Aug. 2, 2012

(30) Foreign Application Priority Data

Oct. 6, 2009   (JP) ................................. 2009-232883

(51) Int. Cl.
| | | |
|---|---|---|
| B32B 15/08 | (2006.01) | |
| B32B 27/08 | (2006.01) | |
| B29D 22/00 | (2006.01) | |
| B32B 25/16 | (2006.01) | |
| B32B 25/18 | (2006.01) | |
| B32B 25/08 | (2006.01) | |
| B32B 25/14 | (2006.01) | |
| F16L 11/08 | (2006.01) | |
| B32B 27/32 | (2006.01) | |
| B32B 1/08 | (2006.01) | |
| B65G 15/34 | (2006.01) | |

(52) U.S. Cl.
CPC ................. *B32B 25/08* (2013.01); *B32B 25/16* (2013.01); *B32B 25/18* (2013.01); *B32B 2307/554* (2013.01); *B32B 2270/00* (2013.01); *B32B 25/14* (2013.01); *F16L 11/08* (2013.01); *B32B 27/327* (2013.01); *B32B 2307/712* (2013.01); *B32B 1/08* (2013.01); *B32B 2307/71* (2013.01); *B65G 15/34* (2013.01); *B32B 2597/00* (2013.01); *B32B 2433/02* (2013.01)
USPC .......... 428/516; 428/36.8; 428/377; 428/462; 428/517

(58) Field of Classification Search
None
See application file for complete search history.

(56) References Cited

U.S. PATENT DOCUMENTS

| | | | |
|---|---|---|---|
| 6,334,466 B1 * | 1/2002 | Jani et al. ....................... | 138/141 |
| 7,758,937 B2 * | 7/2010 | Gong et al. .................. | 428/36.8 |
| 2003/0134983 A1 | 7/2003 | Graf | |

FOREIGN PATENT DOCUMENTS

| | | |
|---|---|---|
| GB | 2256615 | 6/1992 |
| JP | 6-184326 | 7/1994 |
| JP | 10-298353 | 11/1998 |
| JP | 2003-207078 | 7/2003 |
| JP | 2005-524722 | 8/2005 |
| WO | WO2008/108198 | 9/2008 |
| WO | WO2011/042998 | 4/2011 |

* cited by examiner

*Primary Examiner* — Sheeba Ahmed
(74) *Attorney, Agent, or Firm* — Thorpe North & Western LLP

(57) ABSTRACT

A rubber laminate comprises a reinforcing layer and a second rubber layer laminated sequentially on a first rubber layer, at least one outer surface of the first rubber layer and the second rubber layer being covered with an ultra high molecular weight polyethylene layer, wherein the rubber layers covered with the ultra high molecular weight polyethylene layer are formed from a rubber composition comprising from 20 to 40 parts by mass of a softener per 100 parts by mass of a mixed rubber consisting of from 60 to 80% by mass ratio of a diene rubber and 20 to 40% by mass ratio of a ethylene-propylene-diene rubber and/or a butyl rubber.

15 Claims, 3 Drawing Sheets

RUBBER LAMINATE

TECHNICAL FIELD

The present technology relates to a rubber laminate, and particularly relates to a rubber laminate such as a hose or a conveyer belt having improved abrasion resistance and weatherability.

BACKGROUND

High pressure hoses used in construction machinery and the like and conveyer belts used in transporting particulates and the like may repeatedly come in contact with surrounding metal frames and metal piping due to vibrations and the like exerted on surrounding equipment. Therefore, the high pressure hoses and the conveyer belts that are used under such conditions need to have high abrasion resistance. Covering surfaces of the hoses and the conveyer belts with a material having superior abrasion resistance such as an ultra high molecular weight polyethylene (UHMwPE) is conceivable to improve abrasion resistance, but there is a problem in that adhesiveness between some rubber compositions and the ultra high molecular weight polyethylene is low.

In order to solve this sort of problem, Japanese Unexamined Patent Application Publication No. 2003-207078A describes a hose having an outer surface rubber layer that is formed from a rubber composition having a styrene-butadiene rubber (SBR) compounded with from 10 to 50 parts by mass of a softener and/or a plasticizer as a main component and that is covered with an ultra high molecular weight polyethylene. With this hose, because the softener and/or the plasticizer permeate and wet the ultra high molecular weight polyethylene layer and promote interdiffusion and entanglement of molecules between the rubber composition and the ultra high molecular weight polyethylene during vulcanization, the adhesive strength of both components after vulcanization is improved.

However, with the hose of Japanese Unexamined Patent Application Publication No. 2003-207078A, there is a problem in that when a temperature of the hose rises greatly or the hose is subjected to large amounts of UV light from sunlight, the polymers in the rubber composition degrade, and the adhesive strength between the rubber composition and the ultra high molecular weight polyethylene decreases. When the adhesive strength decreases in this way and the ultra high molecular weight polyethylene layer peels off, visual appearance is considerably damaged, which makes it impossible to visually identify cracks and the like that may have formed on a main body of the hose. Additionally, because compatibility between the softener and/or the plasticizer and the styrene-butadiene rubber is low, the softener and/or the plasticizer that permeated the ultra high molecular weight polyethylene layer during vulcanization may bleed onto a surface of the ultra high molecular weight polyethylene layer after vulcanization. As a result, there is a possibility of not being able to distinguish this bleeding from actual damage to the hose.

SUMMARY

The present technology provides a rubber laminate that can improve abrasion resistance and weatherability and is arranged so that the softener does not bleed onto a hose surface after vulcanization. A rubber laminate of the present technology comprises a reinforcing layer and a second rubber layer laminated sequentially on a first rubber layer, at least one outer surface of the first rubber layer and the second rubber layer being covered with an ultra high molecular weight polyethylene layer, wherein the rubber layers covered with the ultra high molecular weight polyethylene layer are formed from a rubber composition comprising from 20 to 40 parts by mass of a softener per 100 parts by mass of a mixed rubber including from 60 to 80% by mass ratio of a diene rubber and 20 to 40% by mass ratio of a ethylene-propylene-diene rubber and/or a butyl rubber.

It is preferable that a paraffin oil is used as the softener. Additionally, it is preferable that the ultra high molecular weight polyethylene has a molecular weight of 1,000,000 or more.

The rubber laminate of the present technology can be preferably used in a hose, wherein the first rubber layer and the second rubber layer are configured as an inner surface rubber layer and an outer surface rubber layer, respectively, the outer surface rubber layer is formed from the rubber composition, and a surface thereof is covered with the ultra high molecular weight polyethylene layer.

Alternatively, the rubber laminate of the present technology can be preferably used in a conveyer belt, wherein the first rubber layer and the second rubber layer are configured as an inner side rubber layer and an outer side rubber layer, respectively, at least the outer side rubber layer is formed from the rubber composition, and a surface thereof is covered with the ultra high molecular weight polyethylene layer.

According to the rubber laminate of the present technology, in the rubber laminate, the rubber layer that is covered with the ultra high molecular weight polyethylene layer is formed from the rubber composition comprising from 20 to 40 parts by mass of the softener per 100 parts by mass of the mixed rubber including from 60 to 80% by mass ratio of a diene rubber and 20 to 40% by mass ratio of a ethylene-propylene-diene rubber and/or a butyl rubber. As a result, the adhesive strength between the rubber layer and the ultra high molecular weight polyethylene layer increases and the ultra high molecular weight polyethylene layer does not easily peel off. Therefore, abrasion resistance can be enhanced.

Additionally, an interdiffusion layer that provides an adhesiveness is formed between the rubber layer and the ultra high molecular weight polyethylene layer, and because the ethylene-propylene-diene rubber and/or the butyl rubber that has excellent weatherability enters the interdiffusion layer, weatherability can be enhanced.

Furthermore, the softener that permeated into the ultra high molecular weight polyethylene layer during vulcanization can return to the outer surface rubber layer or the outer side rubber layer after vulcanization because the ethylene-propylene-diene rubber and the butyl rubber are highly compatible with the softener. Therefore, the softener can be made so as not to bleed onto a surface of the hose or the conveyer belt.

DETAILED DESCRIPTION

Embodiments and examples of the rubber laminate according to the present technology are described below in detail based on the drawings. However, the present technology is not limited to these embodiments and examples.

Figure 1:
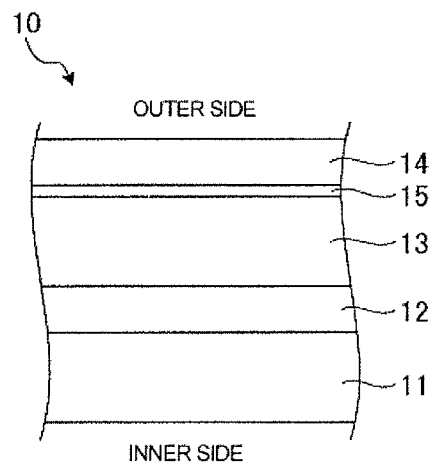
FIG. 1 is a schematic view of a rubber laminate of the present technology.

FIG. 1 shows a rubber laminate according to an embodiment of the present technology.

As shown in FIG. 1, a rubber laminate 10 of the present technology comprises a first rubber layer 11 that is located on an inner side, a reinforcing layer 12 and a second rubber layer 13 laminated sequentially on the first rubber layer 11, and an ultra high molecular weight polyethylene layer 14 covering one outer surface of the second rubber layer 13, wherein the second rubber layer 13, covered with the ultra high molecular weight polyethylene layer 14, is formed from a rubber composition comprising from 20 to 40 parts by mass of a softener per 100 parts by mass of a mixed rubber including from 60 to 80% by mass ratio of a diene rubber and 20 to 40% by mass ratio of a ethylene-propylene-diene rubber and/or a butyl rubber.

According to the rubber laminate of the present technology, in the rubber laminate, the second rubber layer 13 that is covered with the ultra high molecular weight polyethylene layer 14 is formed from the rubber composition comprising from 20 to 40 parts by mass of the softener per 100 parts by mass of the mixed rubber including from 60 to 80% by mass ratio of the diene rubber and 20 to 40% by mass ratio of the ethylene-propylene-diene rubber and/or the butyl rubber. Therefore, the adhesiveness between the second rubber layer 13 and the ultra high molecular weight polyethylene layer 14 increases and the ultra high molecular weight polyethylene layer 14 does not easily peel off.

As a result, abrasion resistance can be greatly enhanced.

Additionally, an interdiffusion layer 15 that provides an adhesion effect is formed between the second rubber layer 13 and the ultra high molecular weight polyethylene layer 14. As the ethylene-propylene-diene rubber and/or the butyl rubber that has excellent weatherability enters the interdiffusion layer 15, weatherability can be enhanced.

Furthermore, the softener that permeated into the ultra high molecular weight polyethylene layer 14 during vulcanization can return to the second rubber layer 13 after vulcanization because the ethylene-propylene-diene rubber and the butyl rubber are highly compatible with the softener. Therefore, the softener can be made so as not to bleed onto a surface of the rubber laminate 10.

As shown in FIG. 1, the rubber laminate has been described as having the first rubber layer 11 that is located on the inner side, the reinforcing layer 12 and the second rubber layer 13 laminated sequentially on the first rubber layer 11, and the ultra high molecular weight polyethylene layer 14 covering one outer surface of the second rubber layer 13, but the present technology is not limited to this configuration of the first rubber laminate and can also be configured as described below.

Examples of configurations of the rubber laminate include a second rubber laminate having a first rubber layer 11 that is located on an inner side, a reinforcing layer 12 and a second rubber layer 13 laminated sequentially on the first rubber layer 11, and an ultra high molecular weight polyethylene layer 14 covering one outer surface of the first rubber layer 11, or a third rubber laminate having a first rubber layer 11 that is located on an inner side, a reinforcing layer 12 and a second rubber layer 13 laminated sequentially on the first rubber layer 11, and an ultra high molecular weight polyethylene layer 14 covering one outer surface of each of the first rubber layer 11 and the second rubber layer 13.

Furthermore, the rubber laminate may be configured so that a thin insulation rubber layer is provided between the ultra high molecular weight polyethylene layer 14 and the reinforcing layer 12.

Figure 2:
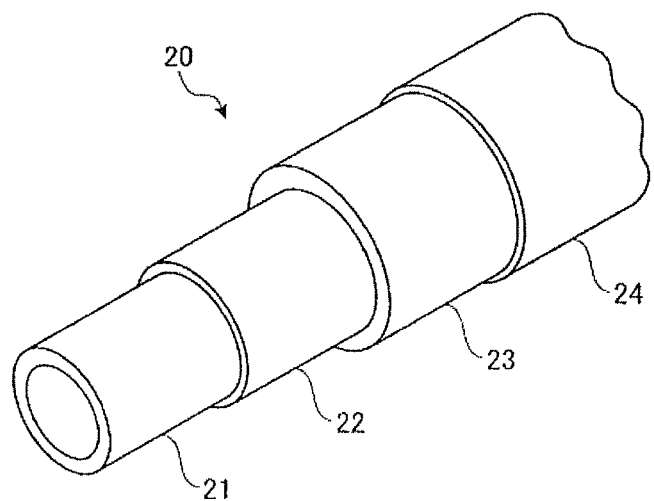
FIG. 2 is a perspective view showing a structure of a hose that is the rubber laminate of the present technology.

Next, an embodiment in which the rubber laminate of the present technology is applied to a hose will be described while referencing FIG. 2. FIG. 2 is a perspective view showing a structure of a hose that is the rubber laminate of the present technology.

As shown in FIG. 2, a hose 20 that is a rubber laminate has an inner surface rubber layer 21 that is a first rubber layer, and a reinforcing layer 22 and an outer surface rubber layer 23 that is a second rubber layer laminated sequentially on the inner surface rubber layer 21. Moreover, the outer surface rubber layer 23 is covered with an ultra high molecular weight polyethylene layer 24. During use, the outer surface rubber layer 23 side is a surface that is exposed to the outdoor environment.

With such a hose 20, the outer surface rubber layer 23 that is the second rubber layer is formed from a second rubber composition comprising from 20 to 40 parts by mass of a softener per 100 parts by mass of a mixed rubber including from 60 to 80% by mass ratio of a diene rubber and 20 to 40% by mass ratio of a ethylene-propylene-diene rubber (EPDM) and/or a butyl rubber (IIR). Here, the butyl rubber (IIR) also includes a halogenated butyl rubber such as Br-butyl rubber (Br-IIR), Cl-butyl rubber (Cl-IIR), or the like. Examples of the diene rubber include natural rubbers (NR), isoprene rubbers (IR), butadiene rubbers (BR), styrene-butadiene rubbers (SBR), and the like.

A first rubber composition that forms the inner surface rubber layer 21 that is the first rubber layer is not particularly limited and examples include rubber compositions with excellent oil resistance, chemical resistance, gas permeation resistance, and refrigerant permeation resistance such as butyl copolymer rubbers and acrylonitrile-butadiene copolymer rubbers (NBR), chlorinated polyethylene rubbers (CM), chlorosulfonated polyethylene rubbers (CSM), and the like.

Additionally, the reinforcing layer 22 is also not particularly limited and at least one layer of a braid or a spiral formed from brass plated wires, steel cords, or organic fiber cords can be used.

The outer surface rubber layer 23 of the hose 20 is formed from the second rubber composition as described above. As shown in the following Table 1, a critical surface tension γc of the ethylene-propylene-diene rubber and the butyl rubber is closer than the styrene-butadiene rubber to a critical surface tension γc of the ultra high molecular weight polyethylene. Therefore, the adhesive strength increases, the ultra high molecular weight polyethylene layer 24 does not peel off easily, and abrasion resistance can be enhanced.

TABLE 1

| | Material | | | |
|---|---|---|---|---|
| | Ultra high molecular weight polyethylene | EPDM | IIR | SBR |
| γc (mN/m) | 29 | 28 | 27 | 33 |

Additionally, the ethylene-propylene-diene rubber and/or the butyl rubber with excellent weatherability enters the interdiffusion layer that provides the adhesiveness (omitted from the drawings) between the outer surface rubber layer 23 and the ultra high molecular weight polyethylene layer 24. Therefore, the weatherability of the hose 20 can be enhanced.

Furthermore, the softener that permeated into the ultra high molecular weight polyethylene layer 24 during vulcanization can return to the outer surface rubber layer 23 after vulcanization because the ethylene-propylene-diene rubber and the butyl rubber are highly compatible with the softener. Therefore, the softener will not bleed onto a hose surface.

Moreover, when brass plated wires are used for the reinforcing layer 22, the adhesiveness between the outer surface rubber layer 23 and the ultra high molecular weight polyethylene layer 24, the weatherability of the hose 20, the bleeding of the softener, and the adhesiveness between the outer surface rubber layer 23 and the brass plated wires are preferably well balanced.

With the hose 20 as described above, for example, the unvulcanized inner surface rubber layer 21 is cylindrically applied on a mandrel and the reinforcing layer 22 is wrapped cylindrically thereon. Then, the unvulcanized outer surface rubber layer 23 formed from the second rubber composition is cylindrically applied on the reinforcing layer 22. Additionally, an identification mark (not shown) may be either preprinted on the outer surface rubber layer 23 using ink or the like; or the identification mark may be printed on the outer surface rubber layer 23 after the outer surface rubber layer 23 is applied.

Next, an ultra high molecular weight polyethylene film that constitutes the ultra high molecular weight polyethylene layer 24 is cylindrically wrapped on the outer surface rubber layer 23. Following this, a covering material (conventionally known materials such as fabrics, metallic materials such as lead, resin materials, and the like are usable) is applied in a ribbon form or a tape form, and then vulcanization is performed. In such a way, the hose 20, being integrally formed by each layer, specifically the inner surface rubber layer 21, the reinforcing layer 22, the outer surface rubber layer 23, and the ultra high molecular weight polyethylene layer 24, being adhered, can be obtained.

According to the hose 20 of the present embodiment, the interdiffusion layer that provides the adhesive strength is formed between the outer surface rubber layer 23 and the ultra high molecular weight polyethylene layer 24. Therefore, adhesiveness increases, the ultra high molecular weight polyethylene layer 24 does not peel off easily, and the abrasion resistance can be enhanced. Additionally, the ethylene-propylene-diene rubber and/or the butyl rubber with excellent weatherability enters the interdiffusion layer that is between the outer surface rubber layer 23 and the ultra high molecular weight polyethylene layer 24. Therefore, the weatherability can be enhanced.

Furthermore, the softener that permeated into the ultra high molecular weight polyethylene layer 24 during vulcanization can return to the outer surface rubber layer 23 after vulcanization because the ethylene-propylene-diene rubber and the butyl rubber is highly compatible with the softener. Therefore, the softener can be made so as not to bleed onto a surface of the hose 20.

Figure 3:
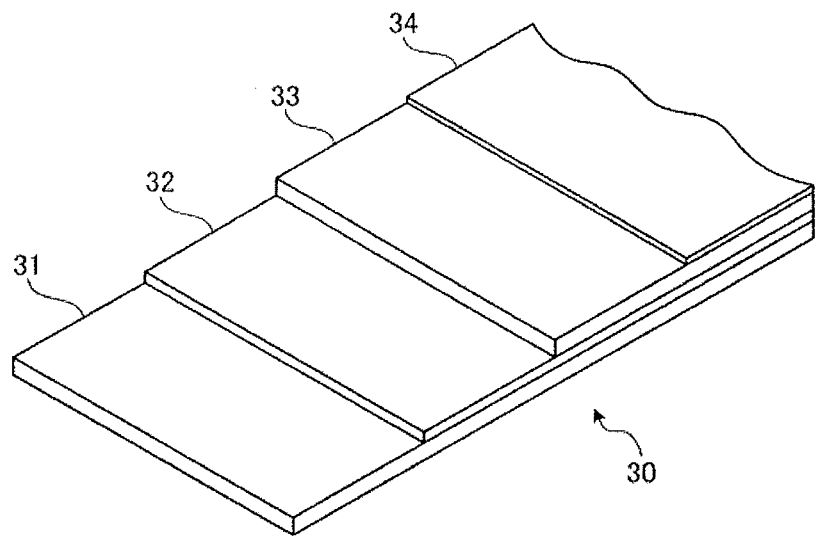
FIG. 3 is a perspective view showing a structure of a conveyer belt that is the rubber laminate of the present technology.

Next, an embodiment in which the rubber laminate of the present technology is applied to a conveyer belt will be described while referencing FIG. 3. FIG. 3 is a perspective view showing a structure of a conveyer belt that is the rubber laminate of the present technology.

FIG. 3 shows a rubber laminate according to another embodiment of the present technology.

As shown in FIG. 3, a conveyer belt 30 that is a rubber laminate has an inner side rubber layer 31 that is a first rubber layer, and a reinforcing layer 32 and an outer side rubber layer 33 that is a second rubber layer laminated sequentially on the inner side rubber layer 31. Moreover, the outer side rubber layer 33 is covered with an ultra high molecular weight polyethylene layer 34. During operation, the outer side rubber layer 33 side is a transporting surface.

With such a conveyer belt, the outer side rubber layer 33 is formed from the second rubber composition described above.

A first rubber composition that forms the inner side rubber layer 31 is not particularly limited and examples include rubber compositions with excellent heat resistance and strength such as natural rubbers, butadiene rubbers, and the like. Additionally, the reinforcing layer 32 is also not particularly limited and at least one layer of steel cords, a canvas formed from organic fiber cords, a cord fabric formed from organic fiber cords, or the like can be used.

The outer side rubber layer 33 is formed in such a way from the second rubber composition. Therefore, the abrasion resistance and the weatherability of the conveyer belt 30 can be enhanced and the softener can be prevented from bleeding onto a surface of the conveyer belt 30.

Furthermore, note that with the conveyer belt 30, the inner side rubber layer 31 is also formed from the same second rubber composition as the outer side rubber layer 33 and may be configured so that a surface thereof is covered with the ultra high molecular weight polyethylene layer 34.

Moreover, when steel cords are used for the reinforcing layer 32, the adhesiveness between the outer side rubber layer 33 and the ultra high molecular weight polyethylene layer 34, the weatherability of the conveyer belt 30, the bleeding of the softener, and the adhesiveness between the outer side rubber layer 33 and the steel cords are preferably well balanced.

In all of the embodiments described above, a paraffin oil is preferably used as the softener. The identification marks printed on the surface of the outer surface rubber layer 23 of the hose 20 or the outer side rubber layer 33 of the conveyer belt 30 will not become discolored because a hue of the paraffin oil is less than 0.5 on the ASTM color scale (ASTM D1500). Therefore, interpretation of the identification marks after vulcanization will not be inhibited.

Additionally, an ultra high molecular weight polyethylene having a molecular weight of 1,000,000 or more is preferably used as the ultra high molecular weight polyethylene that forms the ultra high molecular weight polyethylene layers 24 and 34. If the molecular weight is less than 1,000,000 the polyethylene will foam during vulcanization and the ultra high molecular weight polyethylene layers 24 or 34 will breakdown. Therefore it is not preferable that the molecular weight be less than 1,000,000.

Descriptions of a hose and a conveyer belt as the rubber laminate of the present technology have been given, but the present technology is not limited to these and can be applied to, for example, pneumatic fenders, rubber bearings, tires, rubber rolls, rubber gaskets, expansion/contraction devices for road bridges, flexible joints for concrete structures, aseismic/vibration dampening rubbers, water sealing sheets, industrial-use pneumatic springs, outer diaphragms of train car connecting sections, flap belts, tank linings, and the like.

Additionally, examples of applications as a hose include high pressure hoses for use in construction machinery and the like.

EXAMPLES

Raw materials shown in Table 2 (rubbers and softener) were varied as shown in Table 3 and Table 4. After attaching an ultra high molecular weight polyethylene film having a thickness of 100 μm to an unvulcanized rubber composition compounded with additives shown in Table 2, vulcanization under pressure was performed at 148° C. for 60 minutes, and sheet-like test samples having a size of 6 in.×6 in. and a thickness of 2.5 mm for Examples 1 to 9 (products according to the present technology) and Comparative examples 1 to 5 were produced. The adhesiveness, the weatherability, and the bleeding of the softener onto a surface of the ultra high molecular weight polyethylene (leakage) of these 14 sheet-like test samples were measured and evaluated according to the following methods.

Adhesiveness with the Ultra High Molecular Weight Polyethylene

A clipping having a width of 25 mm was cut from the sheet-like test sample. Resistance force (N/25 mm) when the rubber layer was peeled off at a rate of 50 mm/min and adhesion appearance (area ratio) of the rubber composition to the ultra high molecular weight polyethylene film after peeling were measured at temperatures of 25° C. and 100° C.

Weatherability

The sheet-like test sample was folded in half so that the ultra high molecular weight polyethylene film was on an outer side (light source side) and was used to measure weatherability under a condition of the SA method (reproduction of direct outdoor exposure) of the open-flame carbon-arc lamp weatherability test as stipulated in Japanese Industrial Standard (JIS) K 6266. Exposure conditions were as follows.

Figure 4:
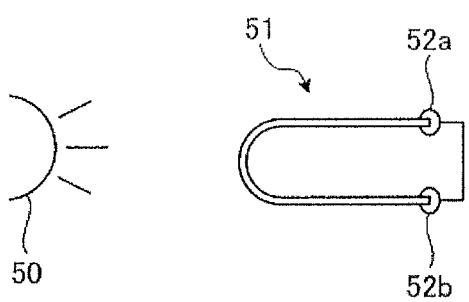
FIG. 4 is a schematic view of a test method.

An overview of the test method is shown in FIG. 4.

As shown in FIG. 4, a sheet-like test sample 51 was placed a predetermined distance from an arc lamp 50, which is a light source. Note that the test sample 51 was curved, ends thereof were secured by clips 52a, 52b, and a surface curved in a "U" shape was arranged so as to be exposed to the arc lamp 50.

Glass filter: Type II
    Test sample surface irradiance: 255 W/m$^2$
    Test durations: 480 hrs, 600 hrs, 1440 hrs
    Spray cycle: After 102 minutes of irradiation, 18 minutes of irradiation and spraying of water An area ratio (%) of a section of the folded part of the test sample in which the ultra high molecular weight polyethylene film peeled off was measured, and was evaluated according to the following standards.

⊙: 0% (no peeling)
    ○: 10 to 40% (slight peeling)
    Δ: 40 to 80% (significant peeling)
    ×: 100% (complete peeling)

Bleeding of the Softener

After clamping the sheet-like test sample in a vice and letting it sit for one day at a temperature of 25° C., an amount of bleeding of the softener onto the surface of the ultra high molecular weight polyethylene film was visually confirmed. The evaluation results are shown as an index with Comparative example 1 being 100. Smaller index values indicate less bleeding. The bleeding test was performed using a surface pressure of 10 MPa.

Additionally, raw materials shown in Table 2 (rubbers and softener) were varied as shown in Table 3 and Table 4 and hose-like test samples having outer surface rubber layers formed from an unvulcanized rubber composition compounded with the additives shown in Table 2 and reinforcing layers formed from brass plated wires were produced as follows.

A reinforcing layer was formed by spirally wrapping brass plated wire on a mandrel having an outer diameter of 34 mm. After applying an unvulcanized rubber sheet (thickness=2.5 mm) that is prepared from each rubber composition on the reinforcing layer, vulcanization under pressure was performed at 148° C. for 60 minutes and hose-like test samples for Examples 1 to 9 (products according to the present technology) and Comparative examples 1 to 5 were produced. Adhesiveness between the rubber and the wire of these 14 hose-like test samples was measured and evaluated according to the following method.

Adhesiveness with Wire

A clipping having a width of 25 mm was cut from the hose-like test sample. Resistance force (N/25 mm) when the outer surface rubber layer was peeled off at a rate of 50 mm/min and adhesion appearance (area ratio) of the rubber composition to the reinforcing layer after peeling were measured.

TABLE 2

| Raw materials | Composition (parts by mass) | Product name | Manufacturer |
|---|---|---|---|
| NR | Tables 3 and 4 | STR-20 | TECK BEE HANG Co. LTD. |
| SBR | Same as above | NIPOL 1502 | Zeon Corporation |
| BR | Same as above | NIPOL BR1220 | Zeon Corporation |
| EPDM | Same as above | Esprene 505 | Sumitomo Chemical Co., Ltd. |
| IIR | Same as above | Exxon Butyl 268 | Japan BUTYL Co., Ltd. |
| Br-IIR | Same as above | Exxon Bromobutyl 2255 | Japan BUTYL Co., Ltd. |
| Softener | Same as above | Diana Process PW-90 | Idemitsu Kosan Co., Ltd. |
| Carbon black | 60 | Shoblack N220 | Cabot Japan K.K. |
| Zinc oxide | 3.0 | Zinc Oxide #3 | Seido Chemical Industry Co., Ltd. |
| Stearic acid | 1.0 | Lunac S 25 | Kao Corporation |
| Antiaging agent | 3.0 | Irganox 1010 | Ciba Geigy |
| Wax | 2.0 | OZOACE-0015 | Nippon Seiro Co., Ltd. |
| Sulfur | 2.0 | Oil-treated sulfur | Hosoi Chemical Industry Co., Ltd. |
| Vulcanization accelerator (NS) | 1.5 | Nocceler NS-P | Ouchi Shinko Chemical Industrial Co., Ltd. |
| Vulcanization accelerator (DM) | 0.5 (added only in Ex. 5) | Nocceler DM-P | Ouchi Shinko Chemical Industrial Co., Ltd. |

TABLE 3

| Item | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| NR | — | — | — | — | 70 | — | — | — | — |
| SBR | 80 | 70 | 60 | — | — | 70 | 70 | 60 | 60 |
| BR | — | — | — | 70 | — | — | — | — | — |
| EPDM | 20 | 30 | 40 | 30 | 30 | — | — | 40 | 40 |
| IIR | — | — | — | — | — | 30 | — | — | — |
| Br-IIR | — | — | — | — | — | — | 30 | — | — |
| Softener | 30 | 30 | 30 | 30 | 30 | 30 | 30 | 20 | 40 |

TABLE 3-continued

| Item | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| UHMwPE adhesiveness test | | | | | | | | | |
| Resistance force (25° C.) | 77 | 68 | 55 | 52 | 82 | 55 | 61 | 58 | 51 |
| Adhesion appearance (25° C.) | 100 | 100 | 100 | 100 | 100 | 100 | 100 | 100 | 100 |
| Resistance force (100° C.) | 20 | 19 | 15 | 13 | 29 | 18 | 22 | 19 | 11 |
| Adhesion appearance (100° C.) | 80 | 100 | 100 | 100 | 100 | 100 | 100 | 100 | 100 |
| Weatherability test | | | | | | | | | |
| 480 hrs | ⊙ | ⊙ | ⊙ | ⊙ | ⊙ | ⊙ | ⊙ | ⊙ | ⊙ |
| 600 hrs | ⊙ | ⊙ | ⊙ | ⊙ | ⊙ | ⊙ | ⊙ | ⊙ | ⊙ |
| 1440 hrs | ○ to ⊙ | ⊙ | ⊙ | ⊙ | ⊙ | ⊙ | ⊙ | ⊙ | ⊙ |
| Bleeding test | 50 | 40 | 30 | 40 | 40 | 30 | 30 | 20 | 40 |
| Wire adhesiveness test | | | | | | | | | |
| Resistance force | 80 | 75 | 60 | 46 | 56 | 41 | 45 | 65 | 54 |
| Adhesion appearance | 100 | 90 | 80 | 80 | 80 | 70 | 70 | 80 | 90 |

TABLE 4

| Item | CE 1 | CE 2 | CE 3 | CE 4 | CE 5 |
|---|---|---|---|---|---|
| NR | — | — | — | — | — |
| SBR | 100 | 90 | 50 | 60 | 60 |
| BR | — | — | — | — | — |
| EPDM | — | 10 | 50 | 40 | 40 |
| IIR | — | — | — | — | — |
| Br-IIR | — | — | — | — | — |
| Softener | 30 | 30 | 30 | 10 | 50 |
| UHMwPE adhesiveness test | | | | | |
| Resistance force (25° C.) | 88 | 82 | 48 | 64 | 45 |
| Adhesion appearance (25° C.) | 100 | 100 | 100 | 100 | 100 |
| Resistance force (100° C.) | 24 | 21 | 12 | 25 | 7 |
| Adhesion appearance (100° C.) | 0 | 20 | 100 | 100 | 100 |
| Weatherability test | | | | | |
| 480 hrs | Δ to ○ | ○ | ⊙ | ⊙ | ⊙ |
| 600 hrs | Δ | Δ | ⊙ | ⊙ | ⊙ |
| 1440 hrs | X | X | ⊙ | ○ | ⊙ |
| Bleeding test | 100 | 80 | 20 | 10 | 70 |
| Wire adhesiveness test | | | | | |
| Resistance force | 90 | 83 | 39 | 70 | 48 |
| Adhesion appearance | 100 | 100 | 50 | 80 | 90 |

In Table 4, CE stands for Comparative Example

It is clear from the evaluation results shown in Table 3 and Table 4 that the sheet-like test samples of the present technology, when compared to the sheet-like test samples of the Comparative Examples, have superior weatherability and adhesiveness with the ultra high molecular weight polyethylene and little bleeding onto the surface of the ultra high molecular weight polyethylene film. Additionally, it was identified that the hose-like test samples of the present technology, when compared to the hose-like test samples of the Comparative Examples (especially Comparative Example 3), have superior adhesiveness with the brass plated wires.

Figure 5:
FIG. 5 is an illustration showing conditions of appearances of the results of weatherability tests.

Conditions of appearances of the results of weatherability tests are shown in FIG. 5. Example 3 and Comparative Example 1 were compared using the former as a product according to the present technology and the latter as a conventional product. As shown in FIG. 5, even after 1,440 hours had passed, the visual appearance of the product according to the present technology (Example 3) was able to maintain soundness over a long period of time, regardless of fine cracks that formed. On the other hand, cracks formed in the conventional product (Comparative Example 1) that is the comparative product after 480 hours had passed and the cracks enlarged as time passed thereafter. At 1,440 hours, significant damage had been done. Therefore, it was confirmed that the product according to the present technology is greatly superior.

In the ultra high molecular weight polyethylene adhesiveness tests, in terms of polymer properties, SBR has a higher strength than EPDM and from a comparison of a γc of each, when it comes to affinity with the ultra high molecular weight polyethylene, compounding with EPDM is superior. Therefore, it was identified that when an amount of EPDM increases, the resistance force decreases and the adhesion ratio increases.

Additionally, in the weatherability tests, in terms of polymer properties, EPDM, IIR, and Br-IIR have less of a diene rubber component than SBR, and therefore have superior weatherability. Therefore, it was identified that when the amount of EPDM increases, weatherability of the polymer-compatible interdiffusion layer between the ultra high molecular weight polyethylene and the rubber composition increases; and that because the interdiffusion layer does not break down, the ultra high molecular weight polyethylene does not easily peel off.

In the bleeding tests, EPDM, IIR, and Br-IIR displayed higher affinity to the softener (paraffin oil) than SBR. Therefore, it was identified that as the amount of EPDM increases, an amount of oil that is expelled under pressure decreases.

In the wire adhesiveness tests, in terms of polymer properties, SBR has a higher strength than EPDM, IIR, and Br-IIR and SBR also has superior adhesiveness with the wires. Therefore, it was identified that when an amount of EPDM increases, the resistance force and the adhesion ratio decrease.

Thus, when comparing Examples 1 to 4, it is clear that the mixtures of SBR and EPDM in the SBR-compounded product Examples 1 to 3 are superior over the BR-compounded product. Particularly, Example 3 is preferably because there is little bleeding.

What is claimed is:
1. A rubber laminate comprising:
a reinforcing layer and a second rubber layer laminated sequentially on a first rubber layer, at least one outer surface of the first rubber layer and the second rubber layer being covered with an ultra high molecular weight polyethylene layer, wherein the rubber layers covered with the ultra high molecular weight polyethylene layer are formed from a rubber composition comprising from 20 to 40 parts by mass of a softener per 100 parts by mass of a mixed rubber including from 60 to 80% by mass ratio of styrene butadiene rubber (SBR), natural rubber (NR), isoprene rubber (IR), or butadiene rubber (BR) and 20 to 40% by mass ratio of a ethylene-propylene-diene rubber and/or a butyl rubber.

2. The rubber laminate according to claim 1, wherein the softener is a paraffin oil.

3. The rubber laminate according to claim 1, wherein a molecular weight of the ultra high molecular weight polyethylene is 1,000,000 or more.

4. The rubber laminate according to claim 1, which is a hose, wherein the first rubber layer and the second rubber layer are configured as an inner surface rubber layer and an outer surface rubber layer, respectively, the outer surface rubber layer is formed from the rubber composition, and a surface thereof is covered with the ultra high molecular weight polyethylene layer.

5. The rubber laminate according to claim 1, which is a conveyer belt, wherein the first rubber layer and the second rubber layer are configured as an inner side rubber layer and an outer side rubber layer, respectively, at least the outer side rubber layer is formed from the rubber composition, and a surface thereof is covered with the ultra high molecular weight polyethylene layer.

6. The rubber laminate according to claim 1, wherein the reinforcing layer comprises at least one layer of a braid or spiral formed from brass plated wires, steel cords, or organic fiber cords.

7. The rubber laminate according to claim 6, wherein the reinforcing layer comprises the brass plated wires.

8. The rubber laminate according to claim 1, further comprising a thin insulation rubber layer between the ultra high molecular weight polyethylene layer and the reinforcing layer.

9. The rubber laminate according to claim 1, wherein the rubber layers covered with the ultra high molecular weight polyethylene layer are formed from the rubber composition comprising from 20 to 40 parts by mass of the softener per 100 parts by mass of the mixed rubber comprising from 60 to 80% by mass ratio of the diene rubber and 20 to 40% by mass ratio of the ethylene-propylene-diene rubber.

10. The rubber laminate according to claim 1, wherein the ultra high molecular weight polyethylene layer covers the outer surface of the first rubber layer.

11. The rubber laminate according to claim 1, wherein the ultra high molecular weight polyethylene layer covers the outer surface of the second rubber layer.

12. The rubber laminate according to claim 1, wherein the ultra high molecular weight polyethylene layer covers the outer surface of each of the first rubber layer and the second rubber layer.

13. The rubber laminate according to claim 1, further comprising an identification mark on the second rubber layer, the ultra high molecular weight polyethylene layer covering the outer surface of the second rubber layer.

14. The rubber laminate according to claim 1, wherein the first and second rubber layers comprise a same rubber composition.

15. The rubber laminate according to claim 1, wherein the mixed rubber includes from 60 to 80% by mass ratio of the styrene butadiene rubber (SBR) and 20 to 40% by mass ratio of the ethylene-propylene-diene rubber and/or the butyl rubber.

* * * * *